(12) United States Patent
Shaw et al.

(10) Patent No.: US 8,175,237 B2
(45) Date of Patent: May 8, 2012

(54) AUDIO INTERFACE

(75) Inventors: Gregory Shaw, Carlsbad, CA (US); Phil Berry, Carlsbad, CA (US); Jimmy Tran, Carlsbad, CA (US); Forest Stephens, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 979 days.

(21) Appl. No.: 12/166,886

(22) Filed: Jul. 2, 2008

(65) Prior Publication Data
US 2010/0002853 A1 Jan. 7, 2010

(51) Int. Cl.
H04M 15/06 (2006.01)
(52) U.S. Cl. .................... 379/142.02; 381/315
(58) Field of Classification Search .............. 379/88, 379/142.02; 370/401
See application file for complete search history.

(56) References Cited

U.S. PATENT DOCUMENTS

| | | | |
|---|---|---|---|
| 7,009,961 B2 * | 3/2006 | Pietrowicz et al. | 370/352 |
| 7,403,604 B2 * | 7/2008 | Mundra et al. | 379/142.02 |
| 7,857,664 B2 * | 12/2010 | Waryck et al. | 439/638 |
| 2005/0210235 A1 * | 9/2005 | Best et al. | 713/151 |
| 2008/0123670 A1 * | 5/2008 | Mundra et al. | 370/401 |
| 2010/0142738 A1 * | 6/2010 | Zhang et al. | 381/315 |

OTHER PUBLICATIONS

ViaSat, Inc., "AN/PSC-14 BGAN Integrated Manpack Terminal", Copyright 2007-2008.
http://www.prc68.com/I/H250.shtml, "H-250/UHandset", Brooke Clarke, N6GCE, Mar. 27, 2001, downloaded from the Internet May 5, 2008.
http://www.prc68.com/I/H350.shtml, "H-350/U Handset", Brook Clarke, N6GCE, Mar. 27, 2001, downloaded from the Internet May 5, 2008.
http://en.wikipedia.org/wiki/RJ11,_RJ14,_RJ25, "RJ11, RJ14, RJ25", downloaded from the Internet May 5, 2008.
http://en.wikipedia.org/wiki/RJ-45, "Registered jack", downloaded from the Internet May 5, 2008.

* cited by examiner

*Primary Examiner* — Curtis Kuntz
*Assistant Examiner* — Maria El-Zoobi
(74) *Attorney, Agent, or Firm* — Fish & Richardson P.C.

(57) ABSTRACT

An audio interface includes interface circuitry configured to translate audio signals received from a military handset to audio signals compatible with a plain old telephone system (POTS) network. The interface circuitry presents a 6-pin (or 5-pin) audio port configured to couple the military handset to the interface circuitry. The interface circuitry further features a 2-wire POTS connector configured to couple the interface circuitry to the POTS network.

11 Claims, 8 Drawing Sheets

AUDIO INTERFACE

BACKGROUND

This document relates to telecommunication audio interfacing.

Communication equipment configured to access the broadband global area network offers the user a range of secure and non-secure data and legacy voice services. The terminal 100 shown in FIG. 1 provides a secure data connection over a commercial satellite communication system 140. The terminal 100 also provides connectivity to a non-secure, plain old telephone system (POTS) network 150, via the commercial satellite communication system 140. In order to carry out a call over a secure military communication system (not pictured), the caller uses a military handset 115 plugged into a legacy audio module 110 via a 6/5-pin audio port.

Alternately, to make a call on the POTS network 150, the caller uses a POTS telephone 125 plugged into a POTS interface module 120 via a connector, for example a 2-pin registered jack (RJ-11). The terminal 100 includes a POTS link I/O module 130 to provide connectivity to the POTS network 150, via a POTS link over the commercial satellite system 140. Typically, the POTS link I/O module 130 features a high speed modem. Using the terminal 100 configured as illustrated in FIG. 1, one caller uses a POTS telephone 125 to make or receive calls to or from a second caller 160 on the POTS network 150. As shown in FIG. 1, the terminal 100 is ready for use under various conditions and from various locations.

SUMMARY

Systems and techniques for interfacing telecommunication audio are described. In one aspect, an audio interface includes interface circuitry configured to translate audio signals received from a military handset to audio signals compatible with a POTS network. The interface circuitry presents a 6-pin (or 5-pin) audio port configured to couple the military handset to the interface circuitry. The interface circuitry further has a 2-wire POTS connector configured to couple the interface circuitry to the POTS network.

This and other aspects can include one or more of the following features. In another aspect of the audio interface, the interface circuitry includes tone circuitry configured to add a POTS network dial tone to the audio signals. The interface circuitry features a first buffer configured to provide impedance matching between the military handset and the tone circuitry. The interface circuitry includes a phone line interface (PLI) circuitry configured to convert a format of the audio signals between a military handset format and a POTS network format. The converting step includes conditioning and isolating the audio signals. Furthermore, the interface circuitry includes volume circuitry configured to provide volume control for the audio signals. Also, the interface circuitry features a second buffer configured to provide impedance matching between the volume circuitry and the military handset. The audio port can be a 6-pin U-229 or a 5-pin U-183 connector. The 2-wire POTS connector can be a surface mount connector when the audio interface is coupled to the POTS network through a high speed modem. Also, the 2-wire POTS connector can be an RJ-11 connector when the audio interface is coupled to the POTS network through a landline.

In another implementation, a telecommunications system includes a telecommunications terminal having connectivity to both satellite and a POTS network. The telecommunications terminal contains an audio interface. The audio interface includes interface circuitry configured to translate audio signals received from a military handset to audio signals compatible with a POTS network. The interface circuitry presents a 6-pin (or 5-pin) audio port configured to couple the military handset to the interface circuitry. The interface circuitry further has a 2-wire POTS connector configured to couple the interface circuitry to the POTS network.

This and other aspects can include one or more of the following features. In another aspect of the telecommunications system, the interface circuitry includes tone circuitry configured to add a POTS network dial tone to the audio signals. The interface circuitry features a first buffer configured to provide impedance matching between the military handset and the tone circuitry. The interface circuitry includes a phone line interface (PLI) circuitry configured to convert a format of the audio signals between a military handset format and a POTS network format. The converting step includes conditioning and isolating the audio signals. Furthermore, the interface circuitry includes volume circuitry configured to provide volume control for the audio signals. Also, the interface circuitry features a second buffer configured to provide impedance matching between the volume circuitry and the military handset. The audio port can be a 6-pin U-229 or a 5-pin U-183 connector. The 2-wire POTS connector can be a surface mount connector when the audio interface is coupled to the POTS network through a high speed modem. Also, the 2-wire POTS connector can be an RJ-11 connector when the audio interface is coupled to the POTS network through a landline.

In another aspect, audio signals are received from a military handset at the audio interface. The received audio signals are further prepared for transmission through a POTS network. The prepared signals are output to the POTS network.

This and other aspects can include one or more of the following features. In another aspect, the audio signals are prepared by adding a POTS network dial tone, while providing impedance matching between the military handset and the tone circuitry. Furthermore, the format of the audio signals is converted between a military handset format and a POTS network format. During the converting step the audio signals are conditioned and isolated. Also, the audio signals are prepared by providing volume control, while providing impedance matching between the volume circuitry and the military handset. The audio signals can be received via a multi-pin audio port. The prepared audio signals can be output via a 2-wire POTS connector.

Certain implementations may provide various advantages. For example, the audio interface my enable callers to communicate directly between equipment connected to a radio transceiver 6-pin (or 5-pin) audio connector and 2-wire POTS equipment. Further aspects, features and advantages will become apparent from the following detailed description, the drawings, and the claims.

BRIEF DESCRIPTION OF THE DRAWINGS

FIG. 6(*b*) is a schematic representation of an implementation of the audio interface.

FIG. 7(*b*) is a schematic representation of an implementation of the audio interface.

DETAILED DESCRIPTION

Figure 2:
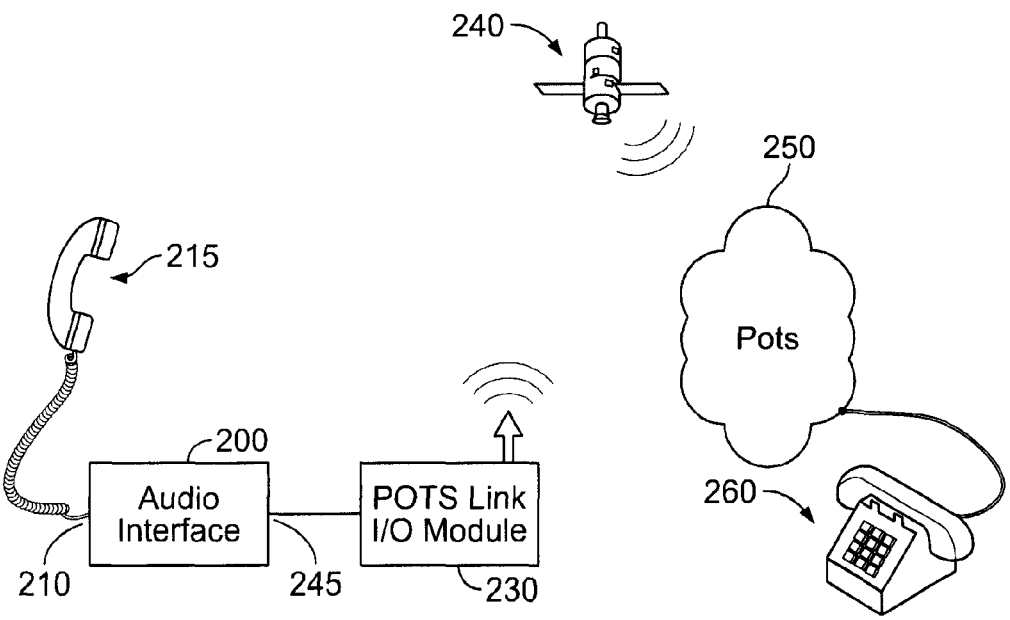
FIG. 2 is a schematic representation of an audio interface.

Referring to FIG. 2, an audio interface 200 enables a first caller to use a rugged, typically military, 6-pin (or 5-pin) audio device 215 to directly make or receive calls to or from a second caller 260 on the POTS network 250.

The audio device 215 is coupled to the input 210 of the audio interface 200. The output 245 of the audio interface 200 is coupled to a POTS link I/O module 230. In this example, the POTS link I/O module 230 is used to provide connectivity to the POTS network 250 via a satellite POTS link 240. Typically, the POTS link I/O module 230 features a high speed modem. In another implementation, when the POTS link is a landline, the POTS link I/O module 230 may be omitted, and the landline plugs directly into the output 245 of the audio interface.

Figure 3:
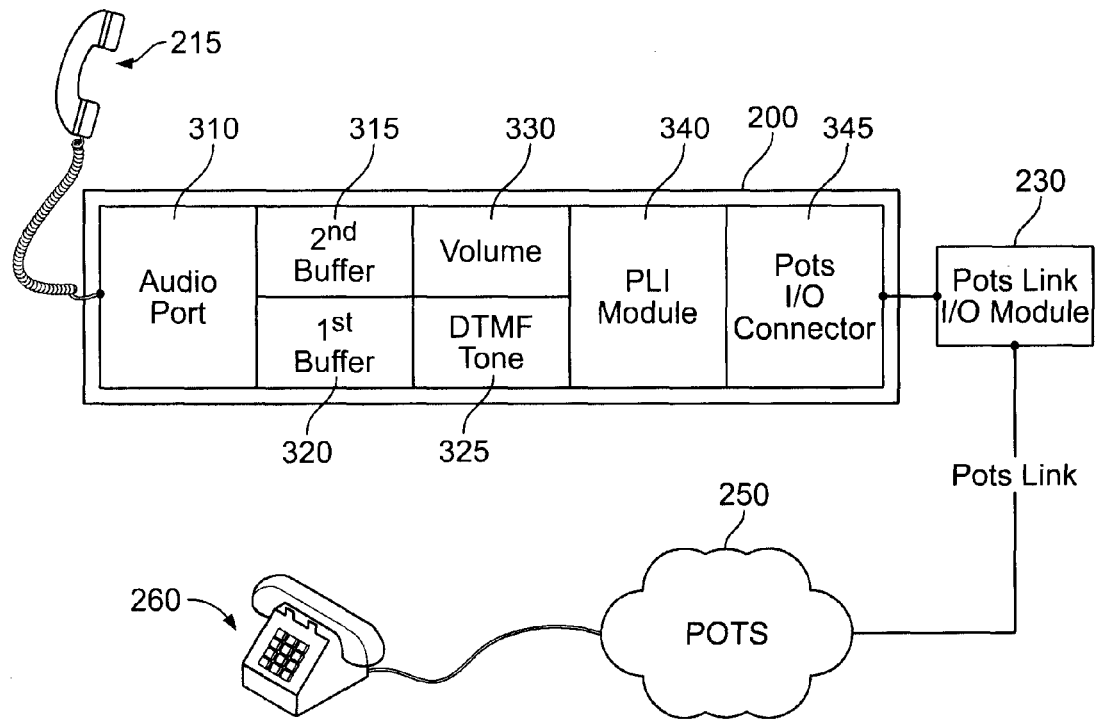
FIG. 3 is a schematic representation of the functional blocks of an audio interface.

The external and internal functionality of the audio interface 200 is illustrated diagrammatically in FIG. 3. An audio device, such as an H-250 or H-350 6-pin (or 5-pin) military handset 215, is coupled to an audio port 310 of the audio interface 200. The voice signal from the microphone of the 6-pin (or 5-pin) military handset 215 is received into the 6-pin (or 5-pin) audio port 310 and processed by a first buffer circuitry 320. The voice signal to the earphone of the 6-pin (or 5-pin) military handset 215 is sent from the 6-pin (or 5-pin) audio port 310 after it was processed by a second buffer circuitry 315. The buffer circuitry 320 and 315 provides signal buffering and impedance matching between the audio port 310 and a tone/volume circuitry 325/330.

The audio signals are processed by the tone/volume circuitry 325/330. The dual-tone multi-frequency (DTMF) tone circuit 325 adds dial tone information required by POTS equipment to make a telephone call. The volume circuit 330 performs volume control for the earphone audio signal.

The phone line interface (PLI) module 340 is used to make telephony connections between terminal 100 and the POTS network 250. The PLI module 340 processes the audio signals from/to tone/volume circuit 325 and 330, including conditioning, isolating and converting the audio signals to a format that is compatible with telephony networks worldwide.

Finally, the POTS signals are exchanged between the audio interface 200 and POTS link I/O module 230 through a 2-wire POTS I/O connector 345. In doing so, the audio interface 200 allows for a direct telephone connection between the 6-pin (5-pin) military handset 215 and a desk phone 260 residing on (or part of) the POTS network 250.

The POTS "tip" signal and the "ring" signal typically provide DC current to power telephone electronics. The POTS "tip" signal and the "ring" signal also provide AC current to ring the telephone bell or electronic ringer. Furthermore, the POTS "tip" signal and the "ring" signal provide and a full duplex balanced voice path). The audio interface 200 translates the POTS "tip" and "ring" signals into the signals required by audio/data equipment 215 connected to, for example, the U-229 family (6-pin) military standard audio connector. The audio interface 200 also translates the signals from the audio/data equipment 215 connected to the U-229 family (6-pin) military standard audio connector into signals required by the audio/data equipment 260 connected to a 2-wire POTS connector (for example an RJ-11 connector). Therefore, the audio interface 200 allows telephone calls and/or data exchanges between POTS equipment such as a desk phone 260 and equipment such as an H-250 or H-350 military handset 215.

Ultimately, the audio interface 200 provides an integrated device to enable a person using a 6-pin (or 5-pin) military handset 215 to make or receive full-duplex calls to or from a 2-wire POTS network 270.

Figure 4:
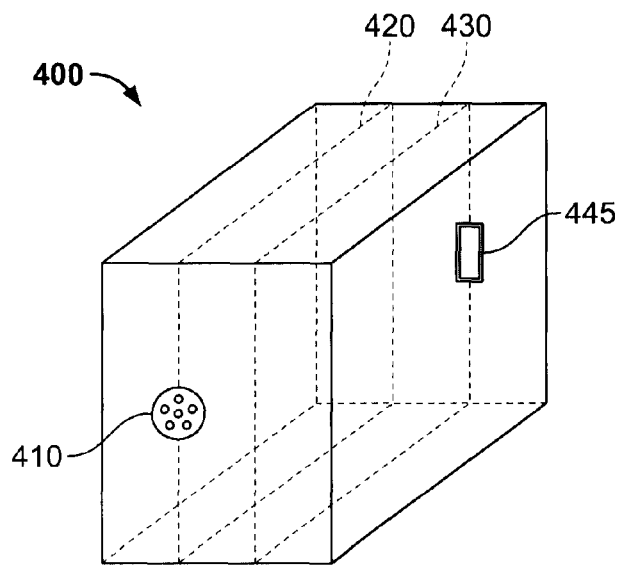
FIG. 4 is a schematic representation of an audio interface module.

The audio interface 200 of FIG. 3 may be implemented as an audio interface module 400 as exemplified in FIG. 4. An audio port 410 mounted on a face plate of the audio interface module 400 may be a connector from the U-229 (6-pin) or the U-183 (5-pin) families of military standard audio connectors. The audio port 410 corresponds to the audio interface input 210. A POTS I/O connector 445 is mounted on the back face of the audio interface module. The POTS I/O connector 445 corresponds to the audio interface output 245. In one implementation, the 2-wire POTS I/O connector 445 may be a MOLEX® 43045-1414 surface mount connector providing connectivity to a high speed modem included in a POTS link I/O module 230. In another implementation, the POTS I/O connector 445 may be a 2-wire RJ-11 connector providing direct connectivity to the POTS network 250 via a landline.

The audio interface module 400 may include at least one printed circuit board (PCB) configured to mechanically support and electrically connect electronic components performing the functions of the audio interface 200. In the example depicted in FIG. 4, the audio interface module 400 includes two PCBs, the first PCB 420 coupled to the 6-pin (or 5-pin) audio port 410, and the second PCB 430 coupled to the POTS I/O connector 445. The functionality of the circuitry corresponding to each PCB is described below.

The audio interface 200 implemented as the audio interface module 400 illustrated in FIG. 4 may be integrated into rugged communication equipment (terminals) configured to use 6-pin (or 5-pin) military handsets. Examples of such terminals are Multi-band SATCOM, and LOS radios like the AN/PSC-5 or the PRC-117F. An example illustrating integration of the audio interface module 300 into an Inmarsat terminal, like the ViaSat PSC-14 is presented in FIG. 5.

Figure 1:
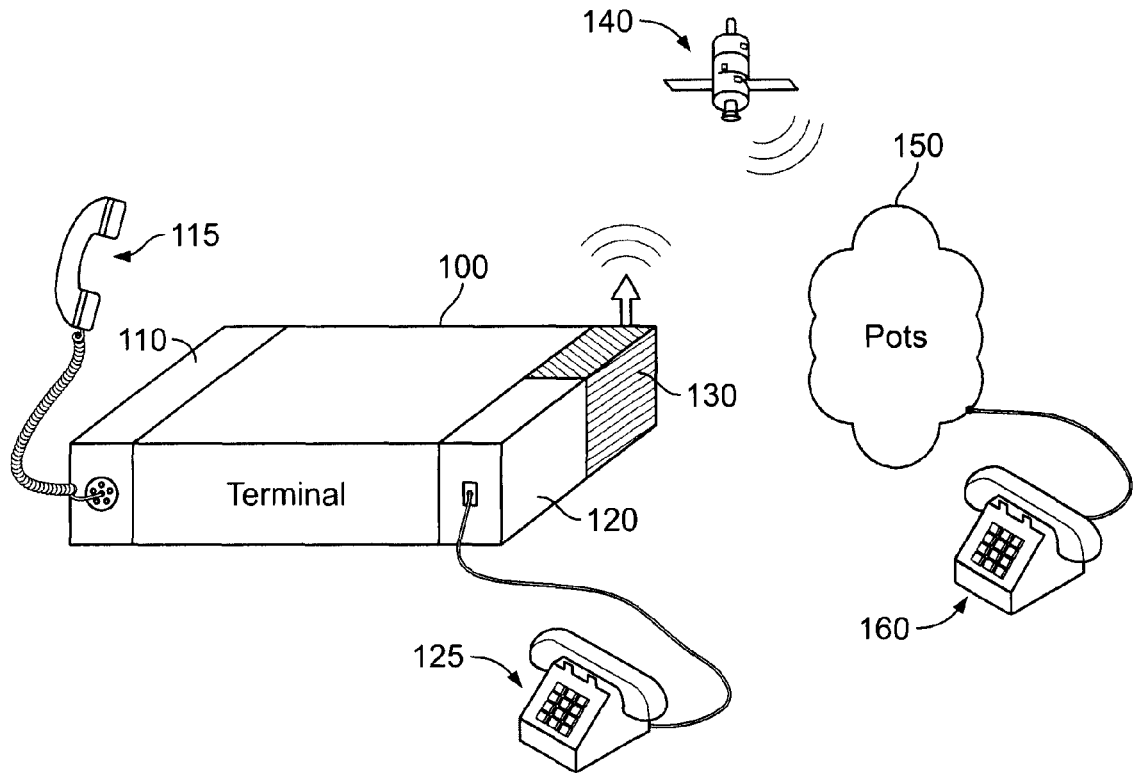
FIG. 1 is a schematic representation of a communication terminal connected to a secure satellite communication system and separately to a POTS network via a non-secure satellite communication system.
Figure 5:
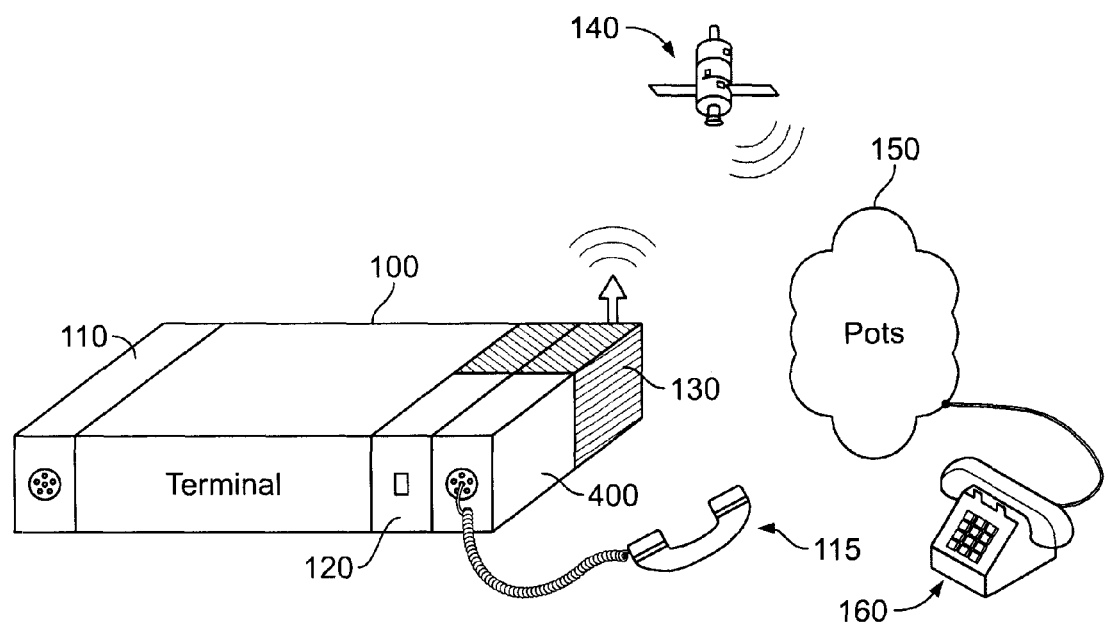
FIG. 5 is a schematic representation of a terminal configured with an audio interface.

Referring to FIG. 5, the terminal 100 may include a 6-pin (or 5-pin) audio interface module 110 to enable calls over a secure satellite communication system. The terminal 100 may also include a POTS interface module 120 to enable calls over a POTS network, if POTS compatible telephone equipment is available to the terminal operator. Communications using modules 110 and 120 were also illustrated in FIG. 1. Returning to FIG. 5, the terminal 100 may also include a 6-pin (or 5-pin) to 2-wire audio interface module 400. By integrating the audio interface module 400, the users of the terminal 100 are able to make or receive calls to or from the POTS network 150, even when a standard POTS telephone is not available, by using a 6-pin (or 5-pin) military handset 115.

Figure 6A:
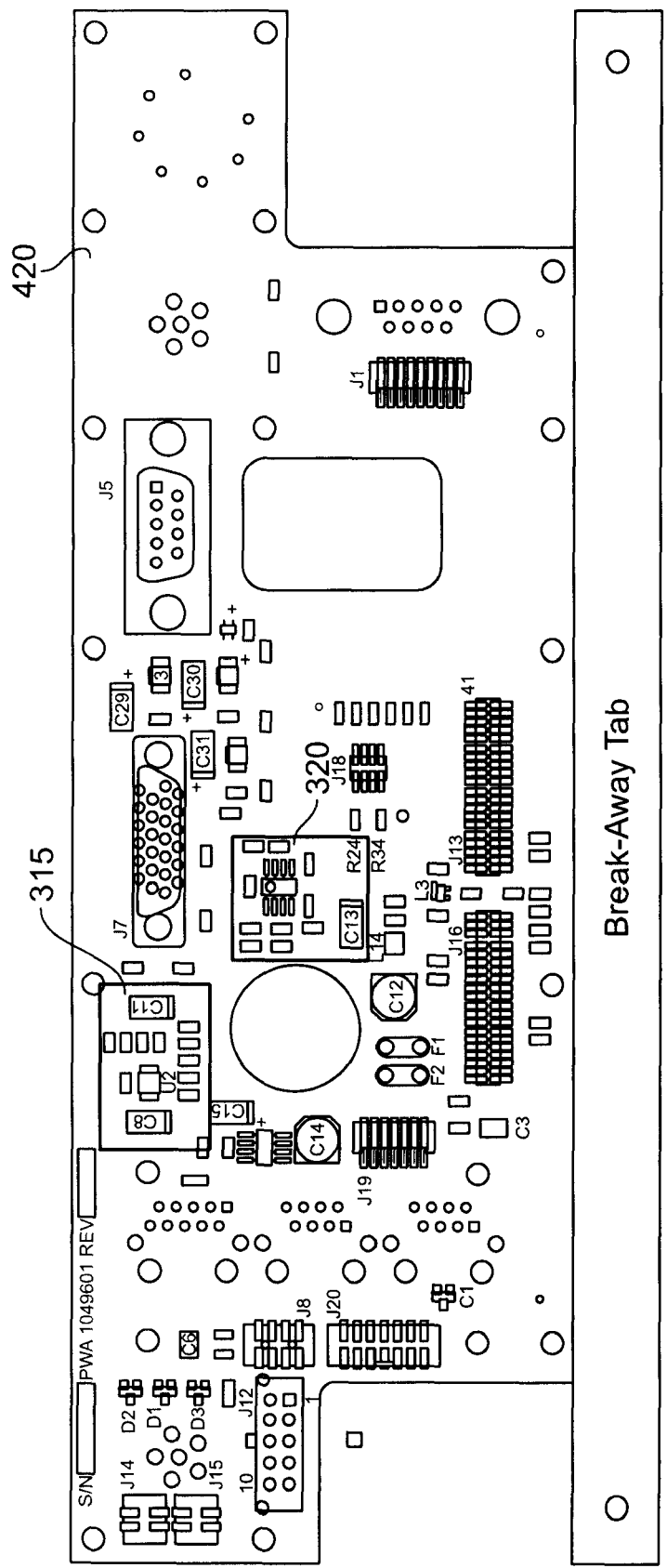
FIG. 6(*a*) is a schematic representation of an implementation of the audio interface.

FIG. 4 illustrates and exemplary implementation of the audio interface module 400. The layout of the first PCB 420 connected to the 6-pin (or 5-pin) audio port 410 is drawn in FIG. 6(*a*). In this exemplary implementation, the first PCB 420 is also referred to as the operator interface. The layout of the second PCB 430 connected to the 2-wire POTS I/O connector 445 is drawn in FIG. 7(*a*). In this exemplary implementation, the second PCB 430 is also referred to as the terminal interface.

Figure 6B:
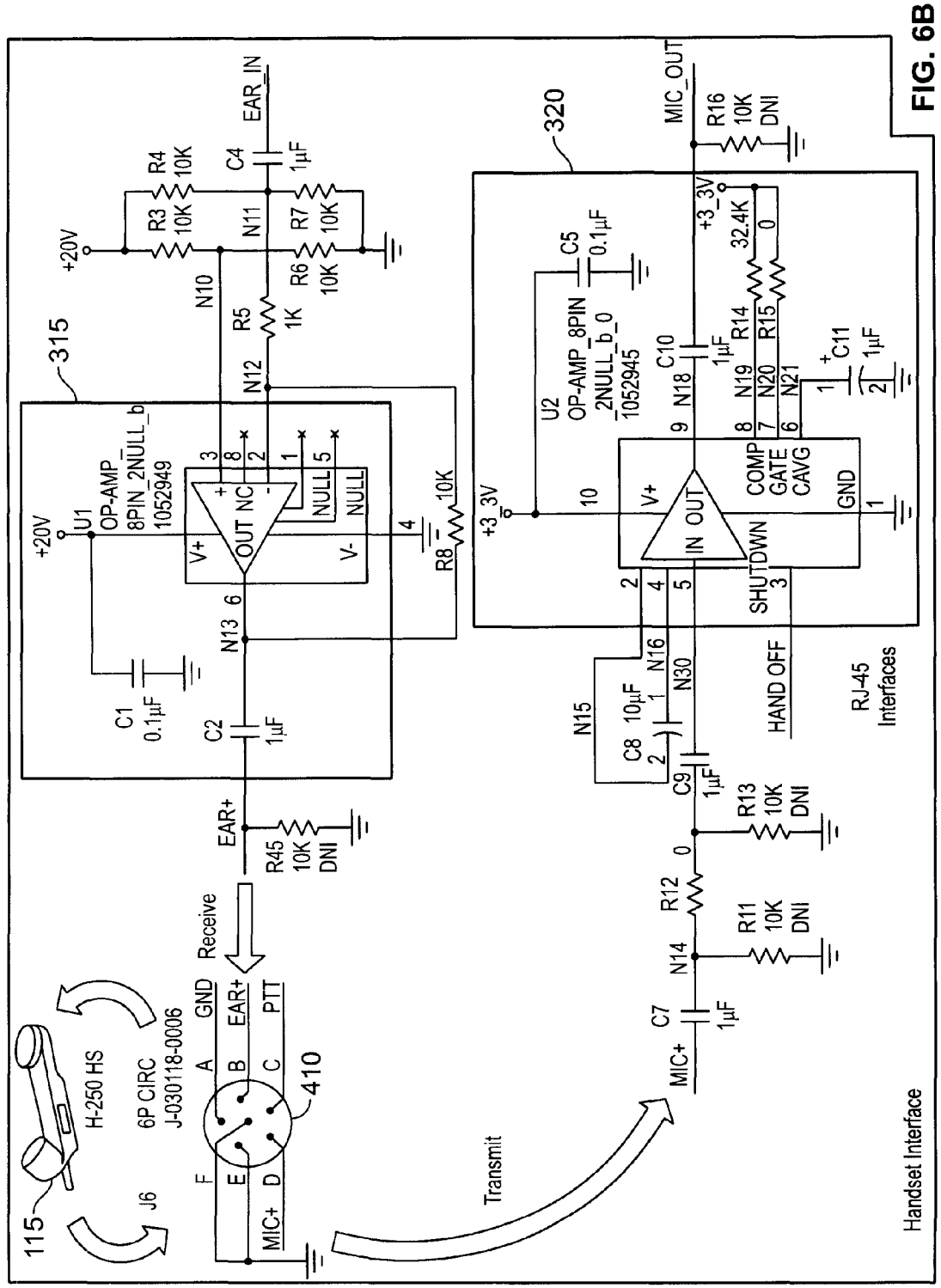

Referring to FIG. 6(*a*), in an exemplary implementation the buffer circuitry 315/320 may be positioned on the first PCB 420. The components and layout of the buffer circuitry are detailed in FIG. 6(b). The first buffer circuitry 320 features an Analog Devices SSM2167 variable gain operational amplifier specifically designed for microphone applications. The first buffer circuitry 320 provides an output that meets the electrical requirements of the Tone/Volume circuit 325/330 to which it is connected.

Returning to the exemplary implementation of FIG. 6(a), the second buffer circuitry 315 may also be positioned on the first PCB 420. The components and layout of the second buffer circuitry 315 are detailed in FIG. 6(b). The second buffer circuitry 315 features an Analog Devices OP177 fixed gain operational amplifier. The second buffer circuitry 315 provides an output that meets the electrical requirements of the military handset 115 to which it is connected.

Figure 7A:
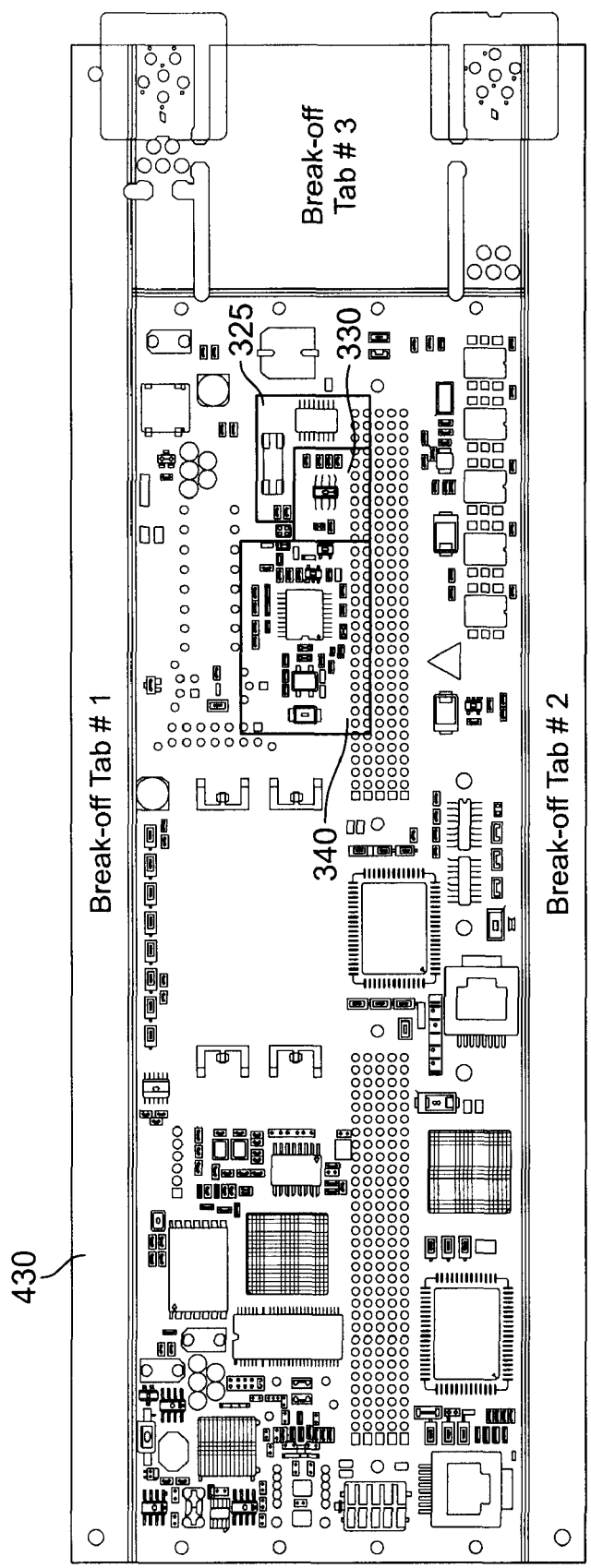
FIG. 7(*a*) is a schematic representation of an implementation of the audio interface.
Figures 1, 7B:
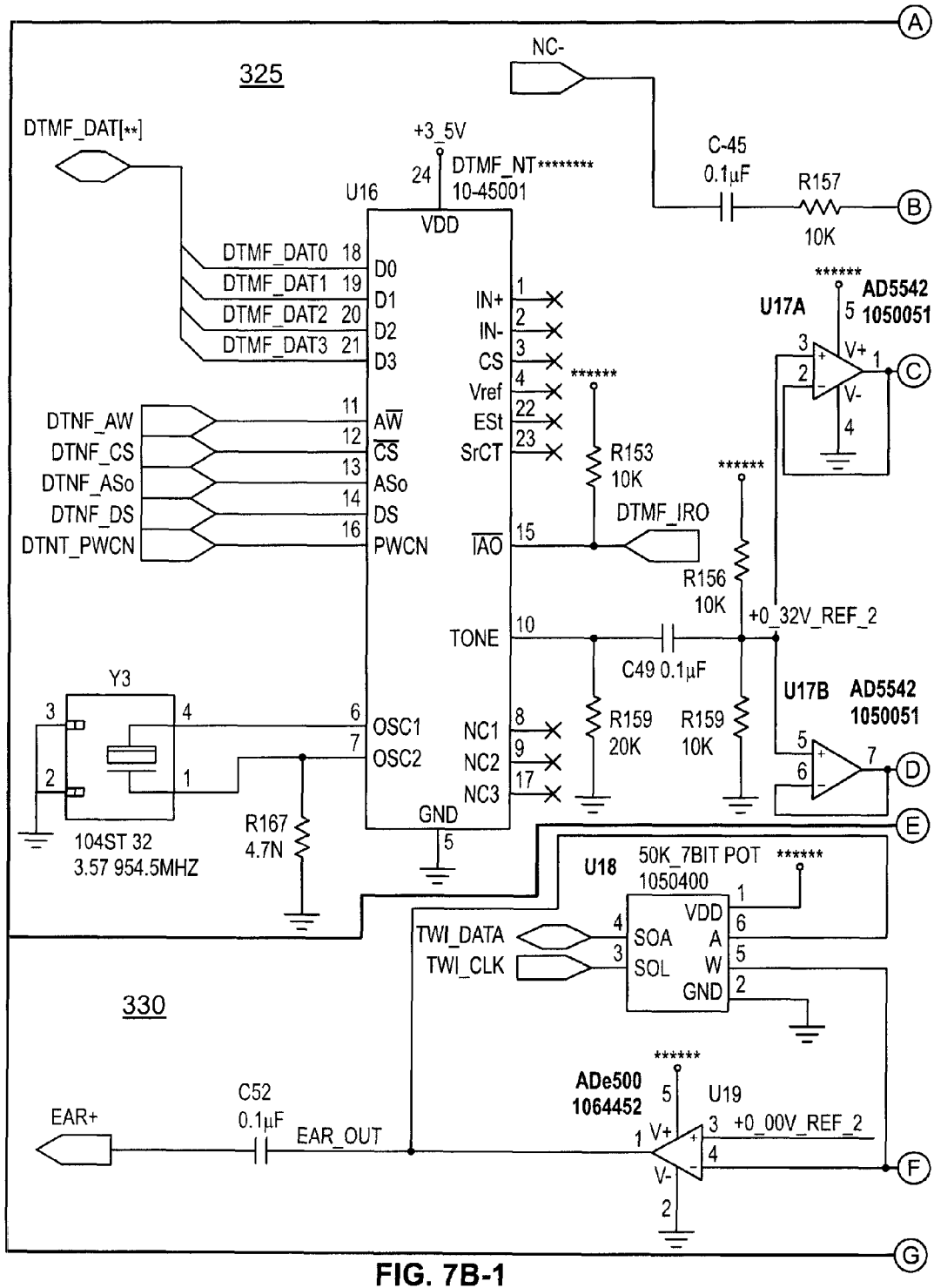
Figures 2, 7B:
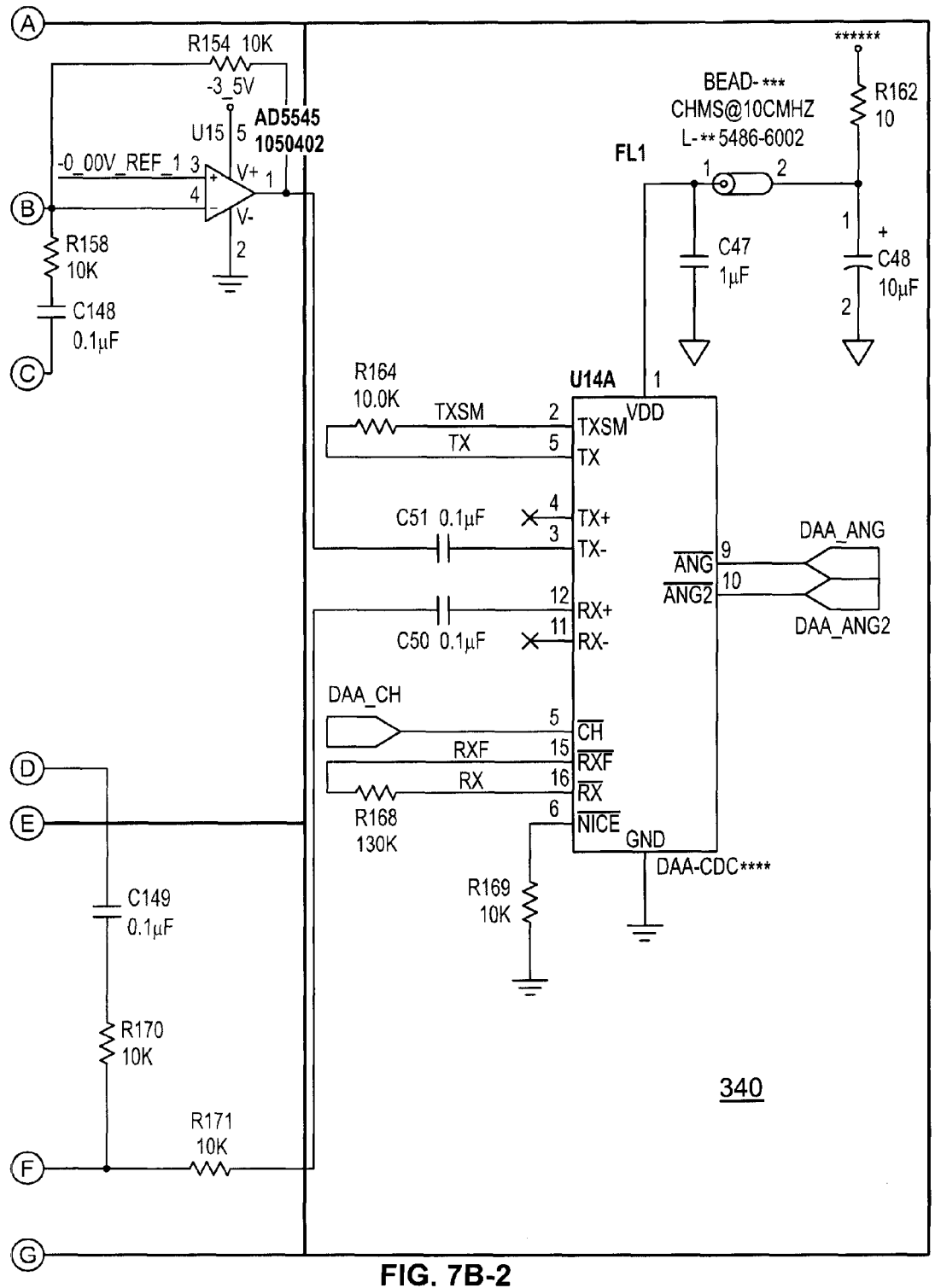

Referring to FIG. 7(a), in an exemplary implementation the tone/volume circuitry 325/330 may be positioned on the second PCB 430. The components and layout of the tone/volume circuitry 325/330 are detailed in FIG. 7(b). The tone generator circuit 325 generates standard dual-tone multi-frequency (DTMF) tones and features a Zarlink Semiconductor MT88L85 DTMF tone generator. The volume circuit 330 provides volume control for the military handset 115 and features an Analog Devices AD5247 digital potentiometer. The PLI module 340 converts both earphone and microphone signals into a format suitable for a 2-POTS network. The PLI module 340 features a Clare CPC5622 phone line interface.

The first PCB 420 and second PCB 430 are coupled together via a flexible circuit. The flexible circuit is connected to the first PCB 420 and to the second PCB 430 via surface-mounted connectors. The audio interface module 400 may be implemented on single PCB which integrates all functions provided by the buffer circuitry 315/320, the tone/volume circuitry 325/330, and the PLI circuitry 340.

Furthermore, the audio interface 200 may be implemented as a removable audio interface module 400 which plugs in and out of a terminal 100. The audio interface may be implemented as one or more PCBs permanently attached inside the terminal 100. In another implementation, the audio interface 200 may be integrated onto the motherboard of a terminal 100. Other implementations are within the scope of the following claims.

What is claimed is:

1. An audio interface comprising:
   interface circuitry configured to translate audio signals received from a military handset to audio signals compatible with a plain old telephone service (POTS) network, the interface circuitry having an input and an output;
   a multi-pin audio port coupled to the input and configured to couple the military handset to the interface circuitry; and
   a 2-wire POTS connector coupled to the output and configured to couple the interface circuitry to the POTS network,
   wherein the interface circuitry comprises
      tone circuitry configured to add a POTS network dial tone to the audio signals,
      first buffer circuitry configured to provide impedance matching between the military handset and the tone circuitry,
      a phone line interface (PLI) circuitry configured to convert a format of the audio signals between a military handset format and a POTS network format, wherein the converting comprises conditioning and isolating the audio signals,
      volume circuitry configured to provide volume control for the audio signals, and
      second buffer circuitry configured to provide impedance matching between the volume circuitry and the military handset.

2. The audio interface of claim 1, wherein the audio port comprises a 6-pin U-229 or a 5-pin U-183 connector.

3. The audio interface of claim 1, wherein the 2-wire POTS connector includes a surface mount connector when the audio interface is coupled to the POTS network through a high speed modem.

4. The audio interface of claim 1, wherein the 2-wire POTS connector comprises a RJ-11 connector when the audio interface is coupled to the POTS network through a landline.

5. A telecommunications system comprising:
   a telecommunications terminal having connectivity both to a satellite network and a plain old telephone service (POTS) network, the telecommunications terminal comprising:
      an audio interface comprising:
         interface circuitry configured to translate audio signals received from a military handset to audio signals compatible with the POTS network, the interface circuitry having an input and an output,
         a multi-pin audio port coupled to the input and configured to couple the military handset to the interface circuitry, and
         a 2-wire POTS connector coupled to the output and configured to couple the interface circuitry to the POTS network,
         wherein the interface circuitry comprises
            tone circuitry configured to add a POTS network dial tone to the audio signals,
            first buffer circuitry configured to provide impedance matching between the military handset and the tone circuitry,
            a phone line interface (PLI) circuitry configured to convert a format of the audio signals between a military handset format and a POTS network format, wherein the converting comprises conditioning and isolating the audio signals,
            volume circuitry configured to provide volume control for the audio signals, and
            second buffer circuitry configured to provide impedance matching between the volume circuitry and the military handset.

6. The audio interface of claim 5, wherein the audio port comprises a 6-pin U-229 or a 5-pin U-183 connector.

7. The audio interface of claim 5, wherein the 2-wire POTS connector includes a surface mount connector when the audio interface is coupled to the POTS network through a high speed modem.

8. The audio interface of claim 5, wherein the 2-wire POTS connector comprises a RJ-11 connector when the audio interface is coupled to the POTS network through a landline.

9. A method comprising:
   receiving audio signals from a military handset;
   preparing the received audio signals for transmission through a POTS network, wherein the preparing comprises
      adding a POTS network dial tone to the audio signals,
      providing impedance matching between the military handset and the tone circuitry,
      converting a format of the audio signals between a military handset format and a POTS network format, wherein the converting comprises conditioning and isolating the audio signals,
      providing volume control for the audio signals, and providing impedance matching between the volume circuitry and the military handset; and outputting the prepared audio signals to the POTS network.

10. The method of claim 9, wherein the receiving audio signals occurs via a multi-pin audio port.

11. The method of claim 9, wherein outputting the prepared audio signals occurs via a 2-wire POTS connector.

* * * * *

UNITED STATES PATENT AND TRADEMARK OFFICE
CERTIFICATE OF CORRECTION

| | | |
|---|---|---|
| PATENT NO. | : 8,175,237 B2 | |
| APPLICATION NO. | : 12/166886 | |
| DATED | : May 8, 2012 | |
| INVENTOR(S) | : Gregory Shaw et al. | |

It is certified that error appears in the above-identified patent and that said Letters Patent is hereby corrected as shown below:

Column 6, line 46, please delete "The audio interface" and insert therefor --The telecommunications system--.

Column 6, line 48, please delete "The audio interface" and insert therefor --The telecommunications system--.

Column 6, line 52, please delete "The audio interface" and insert therefor --The telecommunications system--.

Signed and Sealed this
Twenty-fourth Day of July, 2012

David J. Kappos
*Director of the United States Patent and Trademark Office*